United States Patent
Chen et al.

(10) Patent No.: US 9,203,598 B2
(45) Date of Patent: Dec. 1, 2015

(54) ASYMMETRIC LINK FOR STREAMING APPLICATIONS

(75) Inventors: Huimin Chen, Portland, OR (US);
Duane G. Quiet, Hillsboro, OR (US);
David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 933 days.

(21) Appl. No.: 13/113,821

(22) Filed: May 23, 2011

(65) Prior Publication Data

US 2012/0300085 A1     Nov. 29, 2012

(51) Int. Cl.
| | |
|---|---|
| *H04L 7/00* | (2006.01) |
| *H04N 7/24* | (2011.01) |
| *H04N 5/04* | (2006.01) |
| *H04L 7/033* | (2006.01) |
| *H04L 25/49* | (2006.01) |

(52) U.S. Cl.
CPC .. *H04L 7/00* (2013.01); *H04N 5/04* (2013.01); *H04N 7/24* (2013.01); *H04L 7/033* (2013.01); *H04L 25/4902* (2013.01)

(58) Field of Classification Search
CPC ........ H04N 5/04; H04N 7/24; H04L 25/4902; H04L 7/00; H04L 7/033
USPC ................ 375/219–226; 348/207.1
See application file for complete search history.

(56) References Cited

U.S. PATENT DOCUMENTS

| | | | |
|---|---|---|---|
| 5,347,304 A | 9/1994 | Moura et al. | |
| 5,956,370 A * | 9/1999 | Ducaroir et al. | 375/221 |
| 6,331,999 B1 * | 12/2001 | Ducaroir et al. | 375/226 |
| 7,054,356 B2 * | 5/2006 | Wahl | 375/219 |
| 7,548,549 B2 | 6/2009 | Bergeron et al. | |
| 7,725,029 B1 | 5/2010 | Bernier et al. | |
| 7,792,425 B2 * | 9/2010 | Aronson et al. | 398/30 |
| 7,835,289 B2 | 11/2010 | Lida et al. | |
| 7,937,501 B2 * | 5/2011 | Goodart et al. | 710/2 |
| 2006/0082960 A1 * | 4/2006 | Breen et al. | 361/683 |
| 2010/0079341 A1 * | 4/2010 | Kenington | 342/368 |

FOREIGN PATENT DOCUMENTS

WO     2012161736 A1     11/2012

OTHER PUBLICATIONS

International Search Report and Written Opinion Received for PCT Patent Application No. PCT/US2011/067006, mailed on Aug. 7, 2012, 9 pages.

International Preliminary Report on Patentability received for Patent Application No. PCT/US2011/067006, mailed on Dec. 5, 2013, 6 pages.

* cited by examiner

*Primary Examiner* — Edan Orgad
*Assistant Examiner* — Emmanuel Maglo
(74) *Attorney, Agent, or Firm* — Jordan IP Law, LLC

(57) ABSTRACT

Systems and methods of supporting video streaming operations may involve transmitting a pulse width modulated (PWM) control signal to an imaging device, wherein the imaging devices identifies control data based on a duty cycle of the control signal. The imaging device can configure a video stream based on the control data and synchronize transmission of the video stream based on a frequency of the control signal.

20 Claims, 2 Drawing Sheets

28

ASYMMETRIC LINK FOR STREAMING APPLICATIONS

BACKGROUND

1. Technical Field

Embodiments generally relate to video streaming. More particularly, embodiments relate to data transport technologies for video streaming from a video source to a video processing unit (VPU).

2. Discussion

Typical video streaming operations may begin with the exchange of configuration information between a host controller, which can be connected to a VPU and an attached camera in order to initialize the camera and achieve synchronous operation. During streaming operations, the host controller may periodically monitor camera operation to determine if re-configuration is needed. Therefore, the communications between a host controller and a camera device may be two-way interactions, with low throughput traffic from a host controller to a camera device, and potentially high throughput traffic on the other direction. Conventional approaches to conducting these operations may involve either the deployment of a dedicated link for low-speed control and configuration, and a dedicated link for high-speed video transport, or the deployment of a general purpose symmetrical link for communications between the two. In addition, the necessary isochronous operation for video transport may require synchronicity between a host controller and a camera device based on either a common clock, or packet based timestamp. Such solutions could be associated with relatively high interconnect pin/wire counts, scalability and/or EMI/RFI (electromagnetic interference/radio frequency interference) concerns, under-utilized drivers, and high implementation complexity/costs.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a host apparatus having a regenerated outgoing reference clock to a camera device. This clock may be constructed such that its duty cycle is modulated based on pulse width modulation (PWM) in order to embed camera control and configuration information onto the clock. The host apparatus may also have an incoming link interface to receive a video stream associated with the control signal.

In addition, embodiments can include an imaging apparatus having an incoming link interface to receive a control signal, identify control data based on a duty cycle of the control signal, and configure a video stream based on the control data. The imaging apparatus may also have an outgoing link interface to transmit the video stream based on a frequency of the control signal.

Embodiments may also include a system having a link coupled to a host and an imaging device. In one example, the host includes an outgoing interface to generate a control signal based on a reference clock, modify a duty cycle of the control signal based on control data, and transmit the control signal to the link. The host may also include an incoming interface to receive a video stream associated with the control signal. The imaging device can include a device incoming interface to receive the control signal, identify the control data based on the duty cycle of the control signal, and configure the video stream based on the control data. The imaging device may also include a device outgoing interface to transmit the video stream to the link based on a frequency of the control signal.

Figure 1:
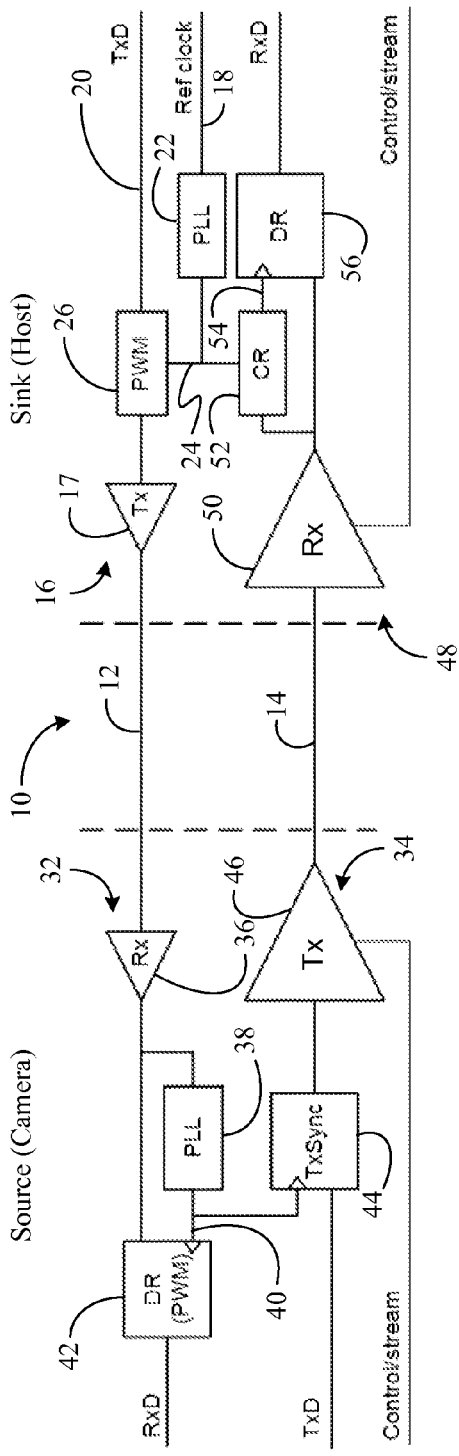
FIG. 1 is a schematic diagram of an example of an asymmetric link between an imaging device and a host apparatus according to an embodiment.

Turning now to FIG. 1, a video streaming topology is shown in which a link 10 between an imaging apparatus/device (e.g., source) and a host (e.g., sink) includes a first sub-link 12 and a second sub-link 14. As will be discussed in greater detail, the illustrated link 10 is asymmetric in that the first sub-link is a low-speed connection used for camera control/configuration and reference clock forwarding, whereas the second sub-link 14 is a high-speed connection that can be used for uncompressed video streaming. In the illustrated example, the host includes an outgoing interface 16 that generates a control signal based on a reference clock 18, modifies a duty cycle of the control signal based on control data 20, and transmits the control signal to the imaging device via the first sub-link 12.

In particular, the outgoing interface 16 of the host (e.g., "host outgoing interface") includes a phase lock module (e.g., phase lock loop/PLL) 22 that generates a clock signal 24 based on the reference clock 18, and a pulse width modulation (PWM) unit 26 to modulate messages onto the control signal based on the control data 20 and the clock signal 24 from the phase lock module 22. The outgoing interface 16 may also include a transmitter 17 to drive the control signal onto the first sub-link 12, wherein the transmitter 17 can be a low-speed transmitter with a relatively low power rating (e.g., low driving strength). As will be discussed in greater detail, using the low driving strength transmitter 17 and PWM unit 26 to embed control data such as configuration data onto a clock signal can enable a reduction in interconnect pin/wire counts, more scalability, less EMI/RFI, and reduced implementation complexity/costs.

Figure 2:
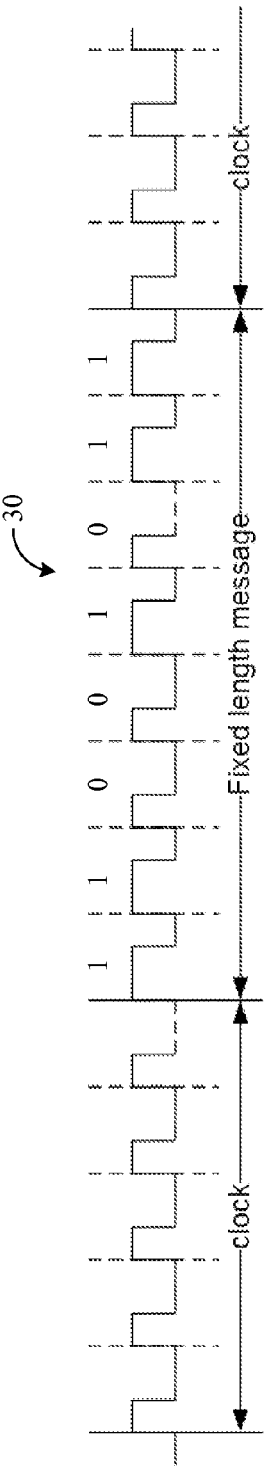
FIG. 2 is a plot of an example of a control signal according to an embodiment.

FIG. 2 shows a control signal 28 having a desired frequency as well as one or more message portions 30 that are pulse width modulated to incorporate a message into the control signal 28. For example, in a binary representation, two duty cycles might be defined such that a logic-0 is represented with a duty cycle of ⅓, and a logic-1 can be represented with a duty cycle of ⅔. Moreover, a protocol could be established in which control and configuration messaging is known to start with a logic-1. Specified signaling (e.g., a logic-1) and/or fixed length messaging could be used to identify the end of the messaging in an isochronous manner. In the illustrated example, the message is a 1-byte fixed length message. Thus, the messaging portions 30 may be used for a wide variety of control and/or configuration functions such as setting camera resolution, reading the camera status, and so on, while simultaneously relaying the reference clock on which the synchronous operation between a video processing unit (VPU) and a camera is based.

With continued reference to FIGS. 1 and 2, the illustrated imaging device includes an incoming interface 32 (e.g., "device incoming interface") that receives the control signal 28, recovers the control data 20 based on the PWM messaging portions 30 of the control signal 28, and configures (e.g., synchronizes) a video stream based on the frequency of the control signal 28. The imaging device may also include an outgoing interface 34 (e.g., "device outgoing interface") that transmits the video stream in accordance with the control signal 28. Thus, synchronous operation is maintained so that frames may be displayed by the host or other receiving device at the same rate as the image capture rate (i.e., no unintended distortion).

In one example, the device incoming interface 32 includes a receiver 36 and a phase lock module 38 to generate a clock signal 40 based on the frequency of the control signal 28. As in the case of the transmitter 17, the receiver 32 may be a low-speed receiver with a relatively low power rating that can enable substantial power savings and die size reduction. The device incoming interface 32 may also include a data recovery module 42 to sample the control signal in accordance with the clock signal 40 from the phase lock module 38. The illustrated data recovery module 42 also detects the start and end of messages in the control signal 28 based on the duty cycle of the control signal 28. Thus, the illustrated control signal 28 facilitates synchronous PWM data recovery (e.g., effectively samples itself), and can enable lower over-sampling rates than achievable through asynchronous PWM data recovery. For example, since the link is operated synchronously, a minimum over-sampling rate of 3× might be used for effective PWM recovery.

The device outgoing interface 34 may also include a synchronization module 44 that synchronizes transmission of the video stream based on the clock signal 40 from the phase lock module 38, wherein the data recovery module 42 can embed acknowledgement messages and/or other status information in the video stream in response to detection of the start of the message portion 30. The transmitter 46 of the device outgoing interface 34 can be a high-speed transmitter with a relatively high power rating to support high-speed video streaming to the host. Thus, the camera's interface to the link 10 is asymmetric in that the power rating of the receiver 36 is less than the power rating than the transmitter 46.

The illustrated host has an incoming interface 48 (e.g., "host incoming interface") to receive the video stream over the second sub-link 14. Accordingly, the incoming interface 48 can have a high-speed receiver 50 with a relatively high power rating, as well as a clock recovery module 52 that generates a clock recovery signal 54 based on the video stream and the clock signal 24 from the phase lock module 22. Thus, the host's interface to the link 10 may be considered asymmetric in that the power rating of the transmitter 17 is less than the power rating of the receiver 50. A data recovery module 56 may sample the video stream based on the clock recovery signal 54 and detect acknowledgements and/or other status information embedded in the video stream.

The illustrated approach therefore provides a dual-simplex link topology having two sub-links, with one sub-link 12 from host to camera for reference clock forwarding and PWM-based control/configuration messaging, and the other sub-link 14 from camera to host for control/configuration messaging response and high-speed video streaming. The operation may start with a VPU driving the PWM control signal 28 through the host to the camera. Since the illustrated PWM control signal 28 is also a clock, it also becomes the reference clock that drives the camera phase lock module 38. The output of the phase lock module 38 can therefore be used to 1) over-sample the received PWM signal 28 synchronously for data recovery; and 2) drive the control/configuration acknowledgement. Moreover, during the control and configuration period, the operation of the link 10 can be low-speed in order to save power. In particular, the host transmitter 17 can have a power rating that is less than the rating of its respective receiver 50, and the camera receiver 36 can have a power rating that is less than the rating of its respective transmitter 46.

In one example, once the initial camera configuration is completed, video streaming begins. The host can continue to forward the PWM control signal 28 to the camera, wherein the frequency of the control signal 28 is pre-defined during the configuration period for high-speed video streaming. The host and the camera may also continue the dynamic control/configuration and monitoring simultaneously during the streaming operation, with the host sending control/configuration messaging through the PWM control signal 28. In such a case, the camera may perform PWM data recovery-based synchronous over-sampling, and then embed acknowledgments in the video stream based on a pre-defined video packet format. Indeed, during the video streaming period, the camera can continue to check for host messaging during start of each or every certain number of video frames. Since the link is operating synchronously, the host may be aware of the start of a next video frame, and is able to send the control/configuration and monitoring message to the camera at the start of the video frame.

Figure 3:
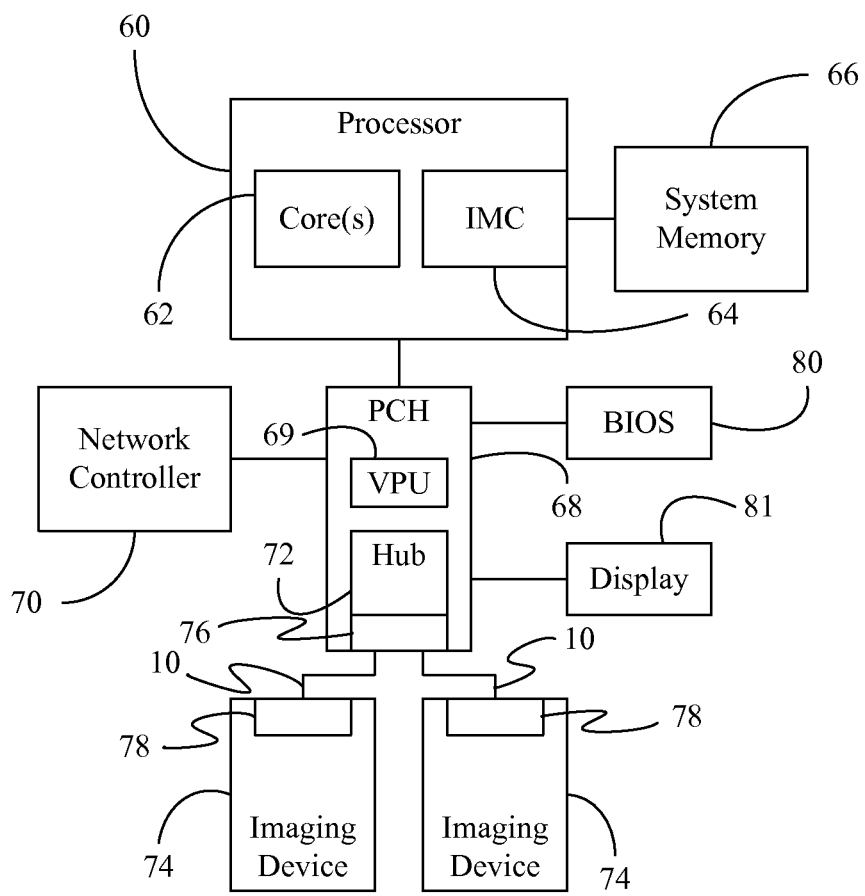
FIG. 3 is a block diagram of an example of a system according to an embodiment.

FIG. 3 shows a computing system 58. The system 58 could be part of a mobile device such as a laptop, personal digital assistant (PDA), mobile Internet device (MID), wireless smart phone, media player, imaging device, smart tablet, etc., or any combination thereof. The system 58 could alternatively include a fixed platform such as a desktop personal computer (PC) or a server. In the illustrated example, a processor 60 includes one or more cores 62 and an integrated memory controller (IMC) 64, which provides access to system memory 66. The system memory 66 could include, for example, double data rate (DDR) synchronous dynamic random access memory (SDRAM, e.g., DDR3 SDRAM JEDEC Standard JESD79-3C, April 2008) modules. The modules of the system memory 98 may be incorporated into, for example, a single inline memory module (SIMM), dual inline memory module (DIMM), small outline DIMM (SODIMM), and so on. The processor 60 may also execute one or more drivers and an operating system (OS) such as, for example, a Microsoft Windows, Linux, or Mac (Macintosh) OS.

The illustrated processor 60 communicates with a platform controller hub (PCH) 68, also known as a Southbridge, via a bus. The IMC 64/processor 60 and the PCH 68 are sometimes referred to as a chipset. The processor 60 may also be operatively connected to a network (not shown) through the PCH 68 and a network controller 70. Thus, the network controller 70 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes.

The illustrated PCH 68 is coupled to a display 81 (e.g., touch screen, liquid crystal display/LCD, light emitting diode/LED, etc.), capable of displaying video streaming data from one or more imaging devices 74 (e.g., web cameras, handheld video cameras, etc.). The PCH 68 may also have internal controllers such as a VPU 69, a host controller 72 connected to the VPU 69, a Serial ATA (SATA, e.g., SATA Rev. 3.0 Specification, May 27, 2009, SATA International Organization/SATA-IO) controller (not shown), a High Definition Audio controller (not shown), etc. The VPU 69 could alternatively reside elsewhere in the system 58, such as in the processor 60. The illustrated host controller 72 may be coupled to the one or more imaging devices 74 via asymmetric links 10, wherein the asymmetric links 10 can be configured for isochronous video streaming operation, as already noted. Thus, the host controller 72 might include a physical layer (PHY) 76 that includes outgoing and incoming interfaces 16, 48 (FIG. 1), and the imaging devices could include a PHY 78 that includes incoming and outgoing interfaces 32, 34 (FIG. 1), already discussed. In one example, the imaging devices 74 transmit video streams to the host controller 72 via the links 10, wherein the video streams are synchronized in accordance with a PWM control signal 28 (FIG. 2) from the host controller 72. The PCH 68 may also be coupled to storage, which can include a hard drive (not shown), read only memory (ROM), optical disk, BIOS (basic input/output system) memory 80, flash memory (not shown), etc.

The illustrated approach therefore eliminates any need for any packet based timestamps or extra wires/pins in order to maintain synchronous operation while the imaging devices 74 are in video streaming mode. In addition, the illustrated approach may be more scalable, exhibit less EMI/RFI, and be associated with reduced implementation complexity/costs relative to conventional approaches.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An imaging apparatus comprising:
a first link interface to receive a control signal associated with a video stream, identify control data based on a duty cycle of the control signal, and configure the video stream based on the control data, the first link interface providing a low-speed connection, wherein the control data includes one or more message portions that have been pulse width modulated to incorporate a message into the control signal to enable the end of the message to be identified in an isochronous manner; and
a second link interface to transmit the video stream based on a frequency of the control signal including the one or more message portions, the second link interface providing a high-speed connection,
wherein the first link interface and the second link interface form an asymmetric link, and synchronous operation of the video stream is maintained so that frames of the video stream may be displayed by a host or other receiving device at the same rate as a capture rate of the image.

2. The apparatus of claim 1, wherein the first link interface includes:
a phase lock module to generate a clock signal based on the frequency of the control signal; and
a data recovery module to sample the control signal based on the clock signal from the phase lock module, and detect a start of a message in the control signal based on the duty cycle of the control signal.

3. The apparatus of claim 2, wherein the data recovery module is to detect an end of the message in the control signal based on the duty cycle of the control signal.

4. The apparatus of claim 2, wherein the message is to be a fixed length message.

5. The apparatus of claim 2, wherein the second link interface includes a synchronization module to synchronize transmission of the video stream based on the clock signal from the phase lock module.

6. The apparatus of claim 2, wherein the data recovery module is to embed an acknowledgement in the video stream in response to detection of the start of the message.

7. The apparatus of claim 1, wherein the first link interface includes a receiver with a first power rating and the second link interface includes a transmitter with a second power rating, wherein the first power rating is less than the second power rating.

8. A host apparatus comprising:
a first link interface to generate a control signal associated with a video stream based on a reference clock, modify a duty cycle of the control signal based on control data, and transmit the control signal, the first link interface providing a low-speed connection, wherein the control data includes one or more message portions that are pulse width modulated to incorporate a message into the control signal to enable the end of the message to be identified in an isochronous manner; and a second link interface to receive the video stream associated with the control signal including the one or more message portions, the second link interface providing a high-speed connection, wherein the first link interface and the second link interface form an asymmetric link, and synchronous operation of the video stream is maintained so that frames of the video stream may be displayed by the host at the same rate as a capture rate of the image.

9. The apparatus of claim 8, wherein the first link interface includes:
a phase lock module to generate a clock signal based on the reference clock; and
a pulse width modulator to modulate a message onto the control signal based on the control data and the clock signal from the phase lock module.

10. The apparatus of claim 9, wherein the message is to be a fixed length message.

11. The apparatus of claim 9, wherein the second link interface includes:
a clock recovery module to generate a clock recovery signal based on the video stream and the clock signal from the phase lock module; and
a data recovery module to sample the video stream based on the clock recovery signal and detect an acknowledgement in the video stream.

12. The apparatus of claim 8, wherein the first link interface includes a transmitter with a first power rating and the second link interface includes a receiver with a second power rating, wherein the first power rating is less than the second power rating.

13. A system comprising:
a link, wherein the link is an asymmetric link including a low-speed link interface and a high-speed link interface;
a host coupled to the link, the host including,
a host outgoing interface to generate a control signal associated with a video stream based on a reference clock, modify a duty cycle of the control signal based on control data, and transmit the control signal to the link, wherein the control signal is transmitted via the low-speed link interface, and
a host incoming interface to receive the video stream associated with the control signal, wherein the video stream is received via the high-speed link interface; and
an imaging device coupled to the link, the imaging device including,
a device incoming interface to receive the control signal, identify the control data based on the duty cycle of the control signal, and configure the video stream based on the control data, wherein the control signal is received via the low-speed link interface, and
a device outgoing interface to transmit the video stream to the link based on a frequency of the control signal, wherein the video stream is transmitted via the high-speed link interface,
wherein synchronous operation of the video stream is maintained so that frames of the video stream may be displayed by the host at the same rate as a capture rate of the image.

14. The system of claim 13, wherein the host outgoing interface includes:
a first phase lock module to generate a first clock signal based on the reference clock, and
a pulse width modulator to modulate a message onto the control signal based on the control data and the first clock signal from the first phase lock module, and
wherein the device incoming interface includes:
a second phase lock module to generate a second clock signal based on the frequency of the control signal, and
a first data recovery module to sample the control signal based on the second clock signal from the second phase lock module, and detect a start of the message in the control signal based on the duty cycle of the control signal.

15. The system of claim 14, wherein the first data recovery module is to detect an end of the message in the control signal based on the duty cycle of the control signal.

16. The system of claim 14, wherein the message is to be a fixed length message.

17. The system of claim 14, wherein the device outgoing interface includes,
a synchronization module to synchronize transmission of the video stream based on the second clock signal from the second phase lock module, wherein the first data recovery module is to embed an acknowledgement in the video stream in response to detection of the start of the message, and
wherein the host incoming interface includes:
a clock recovery module to generate a clock recovery signal based on the video stream and the first clock signal from the first phase lock module, and
a second data recovery module to sample the video stream based on the clock recovery signal, detect a start of a message in the control signal based on the duty cycle of the control signal, and detect the acknowledgement in the video stream.

18. The system of claim 13, wherein the host outgoing interface includes a transmitter with a first power rating and the host incoming interface includes a receiver with a second power rating, wherein the first power rating is less than the second power rating.

19. The system of claim 13, wherein the device incoming interface includes a receiver with a first power rating and the device outgoing interface includes a transmitter with a second power rating, wherein the first power rating is less than the second power rating.

20. The system of claim 13, further including:
a video processing unit coupled to the first and second link interfaces; and
a display coupled to the video processing unit.

* * * * *